(12) United States Patent
Verschueren et al.

(10) Patent No.: US 8,896,905 B2
(45) Date of Patent: Nov. 25, 2014

(54) APPEARANCE-MODIFYING DEVICE, AND METHOD FOR OPERATING SUCH A DEVICE

(75) Inventors: Alwin Rogier Martijn Verschueren, Eindhoven (NL); Gerrit Oversluizen, Eindhoven (NL); Sander Jurgen Roosendaal, Brno (CZ); Thomas Casper Kraan, Eindhoven (NL); Dirk Kornelis Gerhardus De Boer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 442 days.

(21) Appl. No.: 12/999,081

(22) PCT Filed: Jun. 11, 2009

(86) PCT No.: PCT/IB2009/052487
§ 371 (c)(1), (2), (4) Date: Dec. 15, 2010

(87) PCT Pub. No.: WO2009/153713
PCT Pub. Date: Dec. 23, 2009

(65) Prior Publication Data
US 2011/0102881 A1    May 5, 2011

(30) Foreign Application Priority Data

Jun. 17, 2008    (EP) .................................... 08158394

(51) Int. Cl.
*G02F 1/167* (2006.01)
(52) U.S. Cl.
CPC ........ *G02F 1/167* (2013.01); *G02F 2001/1676* (2013.01); *G02F 2201/50* (2013.01); *G02F 2001/1672* (2013.01)
USPC ........................................................ 359/296

(58) Field of Classification Search
CPC .. G02F 1/167; G02F 1/172; G02F 2001/1676
USPC .......................................................... 359/296
See application file for complete search history.

(56) References Cited

U.S. PATENT DOCUMENTS 6,232,950 B1    5/2001    Albert et al.
6,738,039 B2 *  5/2004    Goden ........................ 359/296
(Continued)

FOREIGN PATENT DOCUMENTS

FR    2842916 A1    1/2004
JP    2001356373 A    12/2001
(Continued)

OTHER PUBLICATIONS

Hiemenz et al: "Principles of Colloid and Surface Chemistry"; 3rd Edition, Marcel Dekker Inc., 1997, Chapter 12, pp. 534-584.
(Continued)

*Primary Examiner* — Zachary Wilkes

(57) ABSTRACT

An appearance-modifying device for modifying the visual appearance of a surface covered thereby, the device comprising a first substrate, a second substrate, a spacer structure spacing apart the first and second substrates in such a way that a space between the first and second-substrates is divided into a plurality of cells wherein in each cell, an optically transparent fluid having a plurality of particles is dispersed therein, wherein each of the cells is configured such that a distribution state of the particles is controllable in a first distribution state and an appearance of the surface covered by the appearance-modifying device is determined by optical properties of the particles and a second distribution state in which the particles are concentrated onto one of a first particle concentration site and a second particle concentration site.

13 Claims, 7 Drawing Sheets

(56) References Cited

U.S. PATENT DOCUMENTS

| | | | |
|---|---|---|---|
| 7,038,832 B2 * | 5/2006 | Kanbe | 359/296 |
| 7,283,119 B2 * | 10/2007 | Kishi | 359/296 |
| 7,580,181 B2 * | 8/2009 | Ohshima et al. | 359/296 |
| 7,688,496 B2 * | 3/2010 | Moriyama et al. | 359/296 |
| 2003/0016590 A1 | 1/2003 | Brewer et al. | |
| 2003/0072072 A1 | 4/2003 | Chung et al. | |
| 2003/0081305 A1 | 5/2003 | Chung et al. | |
| 2003/0214479 A1 | 11/2003 | Matsuda et al. | |
| 2004/0145561 A1 | 7/2004 | Ikeda | |
| 2004/0189591 A1 | 9/2004 | Breuil | |
| 2004/0227703 A1 | 11/2004 | Lamvik et al. | |
| 2005/0017943 A1 | 1/2005 | Weisbuch et al. | |
| 2007/0120814 A1 | 5/2007 | Moriyama et al. | |
| 2007/0211330 A1 | 9/2007 | Ohshima et al. | |

FOREIGN PATENT DOCUMENTS

| | | |
|---|---|---|
| JP | 2002162650 A | 7/2002 |
| JP | 2002202534 A | 7/2002 |
| JP | 2004020818 A | 1/2004 |
| JP | 2006293000 A | 10/2006 |
| JP | 2007017735 A | 1/2007 |
| JP | 2007057724 A1 | 3/2007 |
| WO | 2007066000 A1 | 6/2007 |

OTHER PUBLICATIONS

Pohl, H.: Dielectrophoresis: The Behavior of Neutral Matter in Non-Uniform Electric Fields, Cambridge University Press, 1978, Chapter 14.

* cited by examiner

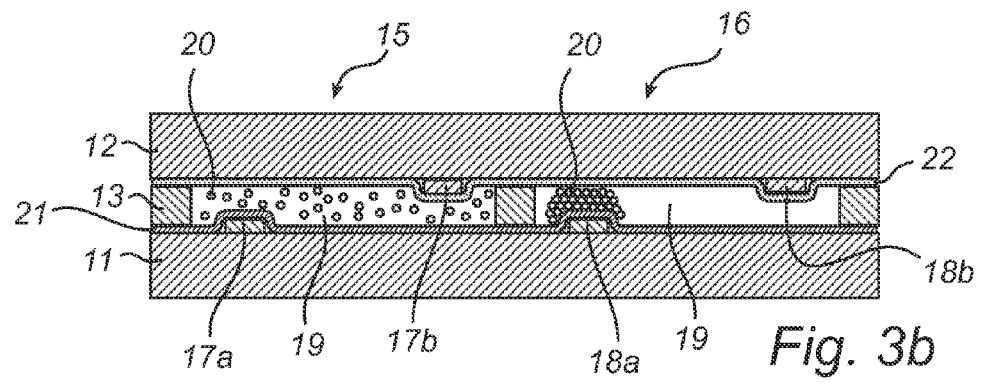
*Fig. 3b*
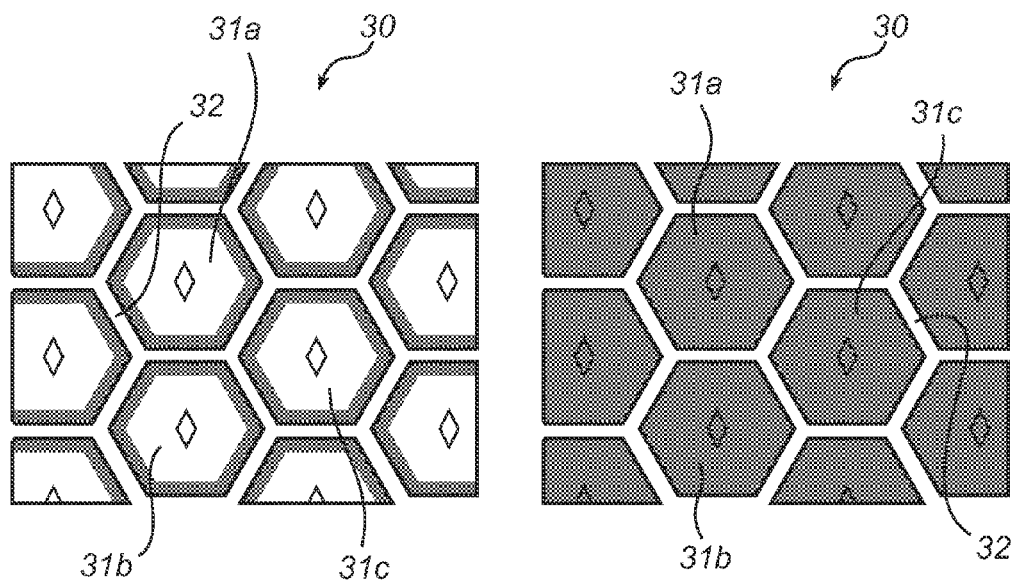
*Fig. 4a*   *Fig. 4b*

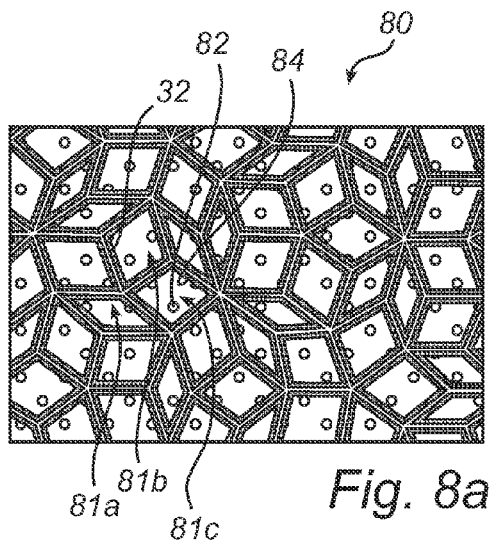
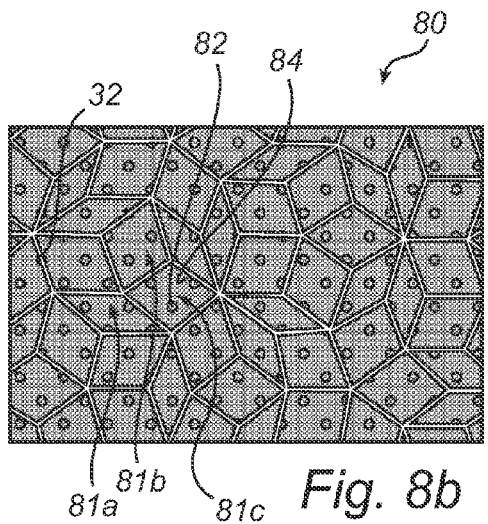
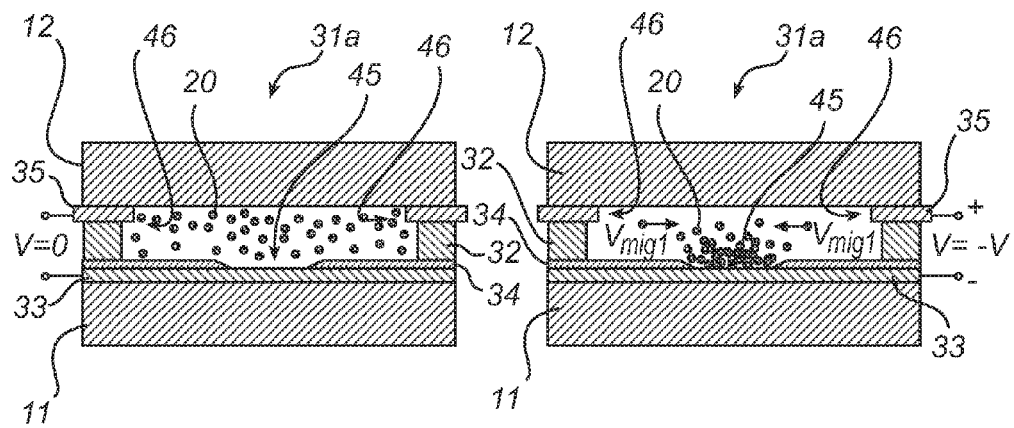
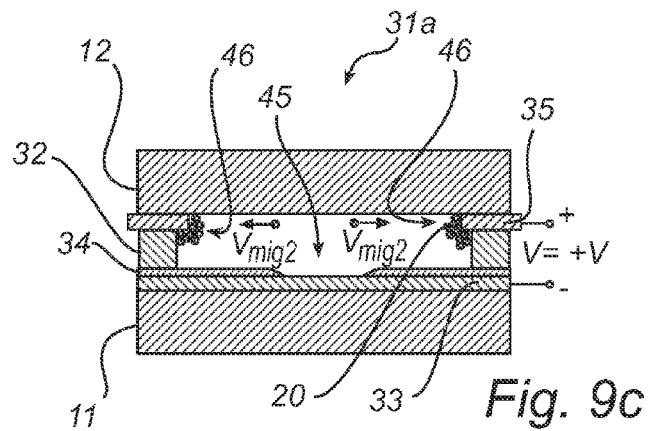

APPEARANCE-MODIFYING DEVICE, AND METHOD FOR OPERATING SUCH A DEVICE

FIELD OF THE INVENTION

The present invention relates to an appearance-modifying device, and to a method for operating such an appearance-modifying device.

BACKGROUND OF THE INVENTION

For many types of products, customizable appearance of the product may be desirable. For example, it may be attractive to be able to customize the appearance of at least a part of a product depending on its current state, to convey information about the current state of the product to a user in an intuitive and attractive way. It may also be perceived as attractive to the user of a product to be able to alter its appearance to reflect the user's personality or mood etc.

According to one well-known example, such customizable appearance of a product is realized by exchangeable "skins" on consumer electronic products, such as mobile telephones. This type of "skins" is typically provided as plastic shells that can be exchanged by the user of the product.

It has also been suggested to use electrically controllable optical properties of an appearance-modifying device covering a surface of a product to alter the appearance of the product.

US 2004/0189591 discloses one example of such an appearance-modifying device in the form of electrophoretic display devices covering control buttons of a programmable remote control unit. Depending on the component to be controlled through the programmable remote control unit, the electrophoretic display devices are adjusted to display the settings relevant to the particular component to be controlled.

The appearance-modifying device disclosed in US 2004/0189591 is provided in the form of microcapsules sandwiched between top and bottom electrode layers. Each microcapsule contains positively charged white pigment chips and negatively charged black pigment chips suspended in a clear suspension medium. By forming a suitable electric field pattern in the appearance-modifying device of US 2004/0189591, a black and white image can be formed, which is thus attributed to the respective button.

Although enabling modification of the appearance of a product, more specifically a programmable remote control, the appearance-modifying device disclosed in US 2004/0189591 is not suitable for every application. In particular, the type of appearance-modifying device described above cannot be used when the surface covered thereby itself conveys information. For example, at least a portion of the surface may be a display that is only sometimes active, but then must be clearly visible to the user of the product. Further, the appearance-modifying device of US 2004/0189591 requires a relatively high drive voltage, typically between 5-15V.

SUMMARY OF THE INVENTION

In view of the above-mentioned and other drawbacks of the prior art, a general object of the present invention is to provide an improved appearance-modifying device, and a method for operating the appearance-modifying device.

According to a first aspect of the present invention, these and other objects are achieved through an appearance-modifying device, for modifying the visual appearance of a surface covered thereby, comprising: a first substrate having a first electrode arranged on a first side thereof; a second substrate arranged opposite the first side of the first substrate, the second substrate having a second electrode arranged on a side thereof facing the first substrate; a spacer structure spacing apart the first and second substrates in such a way that a space between the first and second substrates is divided into a plurality of cells; in each cell, an optically transparent fluid having a plurality of particles dispersed therein, the particles being moveable in the fluid through application of an electric field, wherein each of the cells is configured in such a way that a distribution state of the particles within the cell is controllable, by application of a voltage between the first and second electrodes, from a first distribution state in which the particles are dispersed and an appearance of the surface covered by the appearance-modifying device is determined by optical properties of the particles, to a second distribution state in which the particles are concentrated to at least one of a first particle concentration site provided on the first substrate and a second particle concentration site provided on the second substrate, the second particle concentration site being displaced in relation to the first particle concentration site in a plane parallel to the appearance-modifying device.

In the context of the present application, a "fluid" should be understood to be a substance, which alters its shape in response to any force and tends to flow or to conform to the outline of the chamber in which it may be contained. The term "fluid" thus includes gases, liquids, vapors and mixtures of solids and liquids, when these mixtures are capable of flow.

The term "particles" is not limited to solid particles, but also includes liquid droplets and fluid-filled capsules.

By "particle concentration site" should be understood a site in the cell where the particles concentrate upon application of a voltage between the first and second electrodes. Particles having a given polarity (positive or negative charge) will typically move towards the first or the second particle concentration site depending on the polarity (positive or negative) of the voltage. The locations in the cell of the first and second particle concentration sites are determined by the electric field configuration in the cell resulting from application of a voltage between the first and the second electrode. This electric field configuration may, for example, be determined by the electrode configuration and the configuration of other structures in the cell, etc.

The first and second substrates may typically be provided as sheets, which may be more or less flexible. Suitable substrate materials include, for example, glass, polycarbonate, polyimide etc.

Either of both of the first and second transparent substrates may be any optically transparent member. Suitable substrate materials include, for example, glass, polycarbonate, polyimide etc.

By an "optically transparent" medium is, in the present context, meant a medium, which permits passage of at least a fraction of the light (electromagnetic radiation in the visible spectrum) impinging on it.

It should be noted that the particles dispersed in the fluid may or may not be charged. For uncharged particles, the particles may be caused to move in response to the application of an electric field through dielectrophoresis, which is described in detail in "Dielectrophoresis; the behaviour of neutral matter in non-uniform electric fields", by H. A. Pohl, University Press, Cambridge, 1978.

In the case of charged particles, the majority of the particles may advantageously have the same sign charge so as to prevent clustering of oppositely charged particles. (Electrical neutrality of the fluid is ensured by the presence of ions of opposite charge).

However, it may also be advantageous to provide the particles as a mix of positively and negatively charged particles. The particles may then be collected at both electrodes, depending on polarity.

The particles may, furthermore, be essentially uniformly distributed in the absence of an electric field. When a field is applied, the particles may be re-distributed. Either the particles move until the field is removed or a state is entered in which there is an equilibrium between the forces exerted on the particles through their own charges (in the case of electrophoresis) or dipoles (in the case of dielectrophoresis) and the applied electric field. For a more detailed description of electrophoresis, the following document is referred to:

"Principles of Colloid and Surface Chemistry", by P. C. Hiemenz and R. Rajagopalan, $3^{rd}$ edition, Marcel Dekker Inc., New York, 1997, pp. 534-574.

The present invention is based on the realization that an appearance-modifying device for modifying the appearance of a surface covered thereby can advantageously be achieved using so-called in-plane switching of an electrophoretic device.

The present inventors have further realized that such an appearance-modifying device can advantageously have the first electrode provided on the first substrate and the second electrode provided on the second substrate. Although typically requiring a more accurate alignment than in the case when both the first and second electrode are arranged on the first substrate, a more advantageous configuration of the electric field in the cells can be achieved, whereby a faster switching between the first distribution state, in which the particles are dispersed, and the second distribution state, in which the particles are concentrated to one or both of the particle concentration sites can be accomplished. Moreover, the robustness of the appearance-modifying device can be improved, since the provision of the second electrode on the second substrate ensures electrical isolation between the first and second electrodes without having to completely rely on an insulating dielectric layer to be free from pinholes or other defects.

In the appearance-modifying device according to the present invention, each cell is configured in such a way that the second particle concentration site is displaced in relation to the first particle concentration site in a plane parallel to the appearance modifying device, or, in other words, such that an overlap between the first particle concentration site on the first substrate and the second particle concentration site on the second substrate is prevented. This ensures that each cell is controllable between at least one appearance modifying state determined by the optical properties of the particles and at least one appearance modifying state determined by other structures in the device, such as the fluid, substrate(s), electrode(s), any filter(s) etc.

To maximize the capability of the appearance-modifying device to modify the appearance of a surface covered by the appearance modifying device, the first and second electrodes may advantageously be arranged in such a way that the distribution state is simultaneously controllable in a plurality of the cells, through application of the voltage between the first and second electrodes.

In an electrophoretic display device, such as that disclosed in US 2003/0214479, each cell corresponds to an image pixel and needs to be individually controllable, which is typically realized through the provision of additional addressing electrodes. Such additional electrodes generally occupy space between adjacent cells or require an additional electrode layer and also absorb and/or reflect light. Both of these effects limit the effectiveness of an appearance-modifying device, which typically does not require control of very fine features.

To further improve the capability to effectively modify the appearance of a surface covered thereby, the appearance-modifying device according to the present invention may advantageously be configured in such a way that, for each cell, a ratio between an area controllable by the first and second electrodes between a the first and second particle distribution states, and the total area of the cell is greater than 70%.

As is understood by the person skilled in the art, such a ratio is obtainable through various configurations of the appearance-modifying device according to the present invention.

For example, any one or both of the first and second electrodes may be formed by a transparent material, such as ITO (Indium-Tin-Oxide), IZO (Indium-Zinc-Oxide), sufficiently thin metallic electrodes, or similar well-known materials.

Furthermore, increasing the total area of each cell will typically also increase the above-mentioned ratio between the controllable area and the total area. Assuming typical minimum lateral dimensions of the electrodes and the spacer structure to be around 10 to 30 μm, which is a reasonable assumption given current manufacturing technologies, the desired ratio of more than 70% is readily obtainable for a total area of each cell that is greater than 0.01 $mm^2$.

Another factor contributing to enabling a large ratio between the controllable area and the total area of each cell is the number of cells that are simultaneously controllable by the first and second electrodes. By, for example, arranging the first and second electrodes to simultaneously control at least 100 cells, a substantial amount of space is saved that would otherwise have been needed to accommodate further electrodes passing between cells on their way to other cells to be controlled thereby.

According to one embodiment, the first electrode may be covered by a dielectric layer and the first particle concentration site may be provided as an opening in the dielectric layer, exposing a portion of the first electrode.

Hereby, the electric field in the cell can be controlled through the position and configuration of the opening as well as through the electric properties (notably the conductivity) of the dielectric layer. By selecting a dielectric layer having a conductivity that is lower than the conductivity of the fluid in the cell, the electric field can be shaped to efficiently direct the particles towards the first particle concentration site (the exposed portion of the first electrode) when a suitable voltage is applied between the first and second electrodes.

Which position in the cell of the opening in the dielectric that is the most desirable depends on the application of the appearance-modifying device. For some applications, it may be advantageous to have the openings centrally located in each cell, while other applications may benefit from off-center locations or a mix of some cells having centrally located openings and other cells having off-center openings.

Moreover, the dielectric layer may, in each cell, have a plurality of openings formed therein to expose corresponding portions of the first electrode, thereby providing a plurality of first particle concentrations sites.

Through the provision of a plurality of openings, or, more generally, through the provision in each cell of a plurality of first particle concentration sites and/or a plurality of second particle concentration sites, first and second particle concentration sites can be displaced in relation to each other without imposing severe requirements on the alignment of the first and second substrates in the manufacturing of the appearance-modifying device.

Furthermore, the ability of the appearance-modifying device to conform to a non-flat surface, the appearance of which is to be modified, can be improved because there is a very high probability that there will always be at least one first particle concentration site and at least one second particle concentration site that are offset in relation to each other, such that a lateral electrical field component results when a voltage is applied between the first and second electrodes.

The first substrate may, furthermore, be transparent, enabling transparent cell properties in the second distribution state, in which the particles are concentrated to at least one of the particle concentration sites. A transparent state may be beneficial if, for example, the surface covered by the appearance-modifying device conveys information.

To achieve such transparent properties, one of or both the first and the second electrode may be made of a transparent materials, such as a transparent conducting film, e.g. ITO, IZO or similar, and any dielectric layer(s) may be made of a transparent dielectric material, such as silicon-oxide, silicon nitride or any other suitable transparent dielectric known in the art.

Advantageously, moreover the spacer structure may be configured in such a way that an aperiodic cell pattern is formed by the plurality of cells.

For display applications a matrix consisting of a periodic cell pattern is advantageous, but in contrast, for the application of appearance-modifying devices it has been realized by the present inventors that an aperiodic cell pattern may be advantageous. By configuring the spacer structure in such a way that an aperiodic cell pattern is formed, moiré effects can be reduced and the appearance-modifying device can thus be made more natural-looking and pleasant to look at.

The cell pattern may be a quasi-crystal pattern and preferably a Penrose pattern.

By providing cells with varying shapes, irregular shapes, varying sizes and/or varying orientations, it is possible to provide an aperiodic cell pattern which allows for pre-compensating for curved surfaces to be covered by the appearance-modifying device. For example, it is possible to provide an aperiodic cell pattern with a combination of smaller and larger cells in such way that smaller cells are purposely placed at locations where the cells will become enlarged due to stress and deformations when the appearance-modifying device is applied onto a curved surface of an object. In this way, when the appearance-modifying device is applied onto the curved object, the smaller cells will stretch and enlarge such that, after the appearance-modifying device has been applied to the curved surface, all cells may have the same or almost the same size. Furthermore, providing a cell pattern with a combination of smaller and larger cells may allow for "watermarking", as smaller cells generally transition between distribution states more quickly than larger cells. For instance, providing a cell pattern with larger cells surrounded by smaller cells allows for the larger cells to become visible during a switching step from one state to another as the larger cells transition or switch slower than the smaller cells when an electrical field is applied.

To reduce moiré effects, the present inventors have found that a cell pattern in the form of a Penrose pattern or Penrose tiling pattern may be particularly suitable. Moiré patterns are the interference patterns that can arise when two periodic patterns are overlaid. This is relevant in specific applications where the appearance-modifying device is applied onto an object with a periodic structure (for instance a flat screen TV with a periodic pixel structure). If the appearance-modifying device comprises an aperiodic pattern, the moiré artifact can be reduced. A Penrose pattern is ordered (consisting of a repetition of two rhombus shaped elements), but aperiodic. Penrose patterns are a specific embodiment of quasi-crystals, which are structural forms that are both ordered and aperiodic.

In one embodiment of the appearance-modifying device according to the present invention, the particles may comprise a first set of negatively charged particles and a second set of positively charged particles.

With two differently charged sets of particles, more states can be achieved, especially since the different sets of particles may advantageously have different optical properties. One set of particles may for example be of one color while the other set of particles may be of another color.

With no electrical field applied, both the negatively and positively charged particles may disperse throughout the cell providing an optical appearance being the result of the combination of both negatively and positively charged particles.

In various applications, it may be advantageous to achieve asymmetric control characteristics for the appearance-modifying device according to the present invention. Such asymmetry, which may, for example, be useable for achieving fast switching and/or multiple color states, can be achieved by configuring the cells in such a way that the second particle concentration site has a larger particle concentration area than the first particle concentration site.

By "particle concentration area" should be understood the area across which the particles that are concentrated at a particle concentration site can be distributed. For a particle concentration site having a small particle concentration area, a high physical concentration of particles, in terms of number of particles per unit volume, may be obtained for a given number of particles. For a particle concentration site having a large particle concentration area, the same number of particles may result in a much lower physical concentration of particles.

According to a second aspect of the present invention, the above-mentioned and other objects are achieved by a method for operating an appearance-modifying device according to an embodiment of the present invention, in which the cells are configured in such a way that the second particle concentration site has a larger particle concentration area than the first particle concentration site, wherein the method comprises the steps of: determining a voltage between the first and second electrodes resulting in an electric field configured to concentrate the particles at the second particle concentration site; and applying the voltage between the first and second electrodes to concentrate the particles at the second particle concentration site.

Particles having a given polarity (positive or negative charge) will typically move towards the first or the second particle concentration site depending on the polarity (positive or negative) of the voltage. The locations in the cell of the first and second particle concentration sites are determined by the electric field configuration resulting in the cell from application of a voltage between the first and the second electrode. This electric field configuration may, for example, be determined by the electrode configuration and the configuration of other structures in the cell etc.

The present inventors have realized that this asymmetry in particle concentration area between the first and the second particle concentration site can be used to achieve fast switching between a state in which the particles are dispersed and a state in which the particles are concentrated at a particle concentration site. In particular, the present aspect of the invention is based on the realization that fast switching can be achieved by determining and applying a voltage being such that the particles are driven towards the second particle concentration site having the larger particle concentration area.

Because of the larger particle concentration area, the charged particles concentrated at the second particle concentration site will have a smaller effect on the electric field adjacent to the second particle concentration site than for the same number of particles concentrated at the, smaller, first particle concentration site.

Further variations and effects of the second aspect of the present invention are largely analogous to those of the first aspect described above.

According to a third aspect of the present invention, the above-mentioned and other objects are achieved by a method for operating an appearance-modifying device comprising a plurality of cells, each comprising a plurality of particles including a first set of charged particles having a first color and a first polarity and a second set of charged particles having a second color and a second polarity, opposite the first polarity, distributed in an optically transparent fluid, and first and second electrodes for enabling laterally displacing the particles to concentrate the particles at a first and/or a second particle concentration site through application of a voltage between the first and second electrodes, wherein the cell is configured in such a way that application between the first and second electrodes of a given voltage results in a first electric field adjacent to the first particle concentration site and a second electric field adjacent to the second particle concentration site, the first electric field having a higher field strength than the second electric field, the method comprising the steps of: determining a polarity and a magnitude of the voltage between the first and second electrodes resulting in that the first electric field is sufficiently strong to concentrate the first set of charged particles to the first electrode, and in that the second electric field is so weak that the second set of particles substantially remain in a dispersed state; and applying the determined voltage between the first and second electrodes to thereby control the cell to a state having substantially the second color.

The present inventors have further realized that an asymmetry in cell configuration can be used to achieve several color states using only a single pair of electrodes in each cell. By selecting properties (polarity and magnitude) of a voltage between the first and the second electrode that result in an electric field configuration that is capable of driving particles of one polarity towards the first particle concentrations site, but that is substantially not capable of driving particles of the opposite polarity towards the second particle concentration site, a single set of particles can be controlled selectively using only the first and the second electrode.

Based upon this realization, the cells comprised in the appearance-modifying device can be controlled to four different color states: a first state in which all particles are dispersed in the fluid; a second state in which the first set of particles are concentrated at the first particle concentration site and the second set of particles are dispersed in the fluid; a third state in which the second set of particles are concentrated at the first particle concentration site and the first set of particles are dispersed in the fluid; and, finally, a fourth state in which the first set of particles are concentrated at the first particle concentration site and the second set of particles are concentrated at the second particle concentration site, or vice versa.

Further variations and effects of the third aspect of the present invention are largely analogous to those of the first and second aspects described above.

BRIEF DESCRIPTION OF THE DRAWINGS

These and other aspects of the present invention will now be described in more detail, with reference to the appended drawings showing currently preferred embodiments of the invention, wherein:

FIGS. 3a-b are cross-section views of the appearance-modifying device of FIG. 2 taken along the line A-A, illustrating exemplary configurations of the appearance-modifying device;

FIGS. 4a-b are top views of an exemplary appearance-modifying device according to another embodiment of the present invention in two different states of the device;

FIGS. 8a-b schematically illustrate two states of an exemplary appearance-modifying device having an aperiodic cell structure;

FIGS. 9a-c are cross-section views illustrating fast switching between states of an appearance-modifying device according to an embodiment of the invention.

DETAILED DESCRIPTION OF PREFERRED EMBODIMENTS

The present invention will be mainly described hereinafter with reference to an in-plane electrophoretic appearance-modifying device controllable to a transparent state.

It should be noted that this by no means limits the scope of the invention, which is equally applicable to in-plane electrophoretic appearance-modifying devices that are not controllable to a transparent state, such as, for example appearance-modifying devices having a non-transparent first substrate, which may have other optical properties, such as colors or structures, in itself.

There are a large number of applications for various embodiments of the appearance-modifying device according to the present invention, some of which are schematically illustrated in FIG. 1a-g.

Figure 1A:
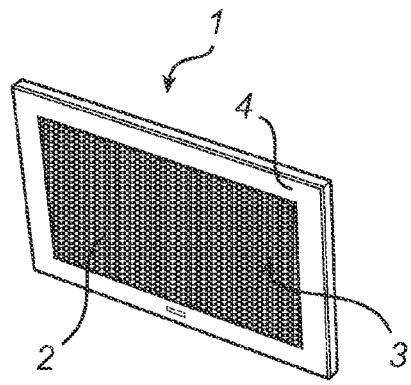
FIGS. 1a-g schematically illustrate various applications for embodiments of the appearance-modifying device according to the present invention.
Figure 1B:
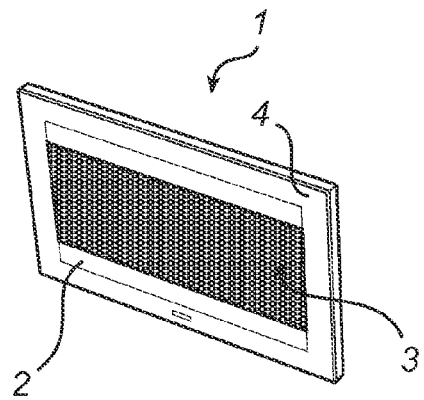
Figure 1C:
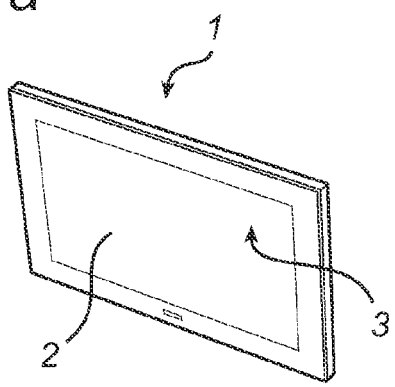

In FIGS. 1a-c, a flat screen television device 1 is provided with an appearance-modifying device 2 covering at least the display 3 of the television device 1.

FIG. 1a shows the television device 2 in normal, full-screen operation in which the entire display is used for displaying image content, with the appearance-modifying device 2 in its transparent state. Accordingly, the entire display 3 of the television device 1 is visible for a viewer.

FIG. 1b shows the television device 1 in wide-screen operation with the appearance-modifying device 2 in a partially transparent state such that a portion of the display 3 has had its appearance modified by the appearance-modifying device 2. In the present example, the appearance-modifying device 2 has modified the portion of the display 3 that is not used to display image content to have essentially the same appearance as the frame 4 surrounding the display 3.

Finally, FIG. 1c shows the television device 1 when turned off, with the appearance-modifying device 2 in a state in which it modifies the entire display 3 to have essentially the same appearance as the frame 4 surrounding the display 3.

Figure 1D:
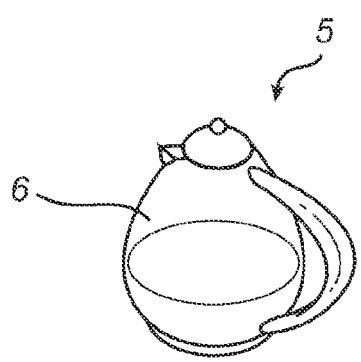
Figure 1E:
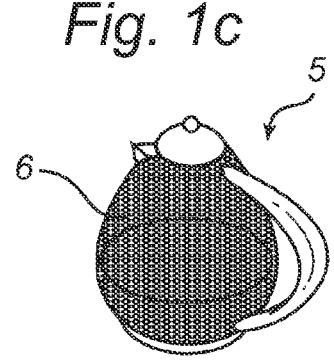

A further application in the form of a water boiler 5 is schematically illustrated in FIGS. 1d-e. By covering the water boiler 5 by an appearance-modifying device 6, the water boiler can be made to visually illustrate to a user in which state it is. For example, the appearance-modifying device 6 can be controlled between a first color, for instance blue, to indicate that the water in the water boiler is cold and a second color, for instance red, to indicate that the water (and thus the water boiler 6) is hot. Alternatively, in accordance with another embodiment of the present invention the water boiler 6 may be controlled between, say, a transparent state and three different colors to indicate four different states of the water boiler 6, for example transparent, blue, red and finally black when the water is boiled.

Figure 1F:
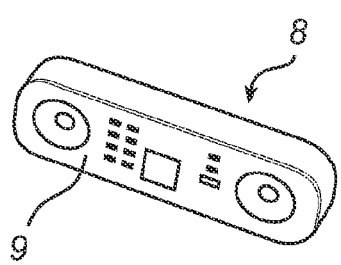
Figure 1G:
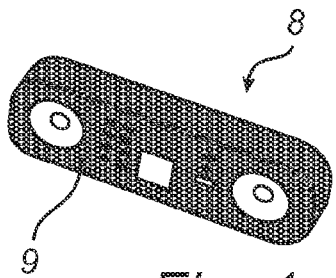

In another application, in the form of the music player 8 in FIGS. 1f-g, the music player 8 can be covered by an appearance-modifying device 9 to enable a user to control the appearance, such as the color, of the music-player according to her/his mood or personal preference. Alternatively, in accordance to another embodiment of the present invention the music player 8 can be covered by an appearance-modifying device 9 which in controllable between four different appearances, such as four different colors.

Having now indicated some of the numerous applications for an appearance-modifying device, an exemplary embodiment of the appearance-modifying device according to the present invention will be described below with reference to FIGS. 2a-b.

Figure 2A:
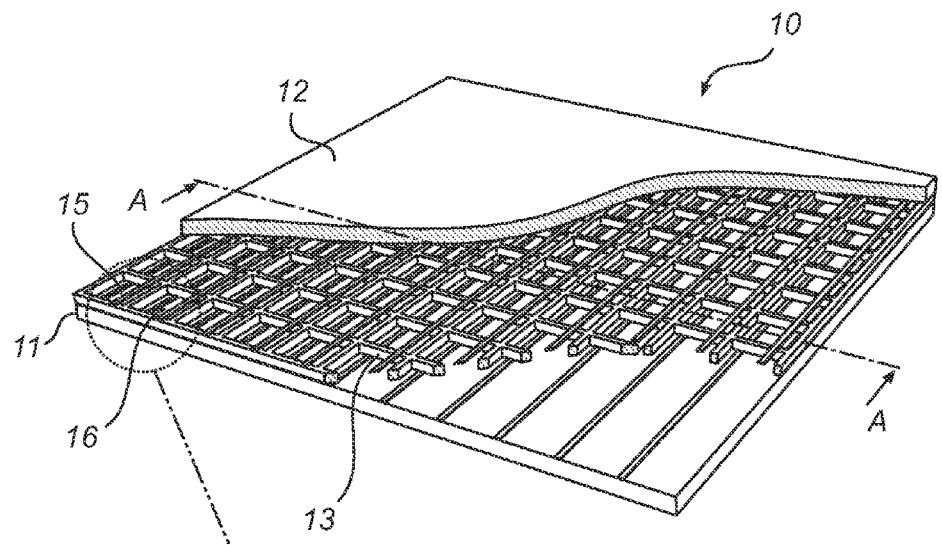
FIGS. 2a-b are perspective views of an exemplary appearance-modifying device according to an embodiment of the present invention.

FIG. 2a schematically illustrates an appearance-modifying device 10 comprising first 11 and second 12 oppositely arranged transparent substrates. The substrates 11, 12 are spaced apart by a spacer structure 13 in such a way that the space between the first 11 and second 12 substrates is divided into a plurality of cells 15, 16 (only two cells are indicated by reference numerals in FIG. 2a).

Figure 2B:
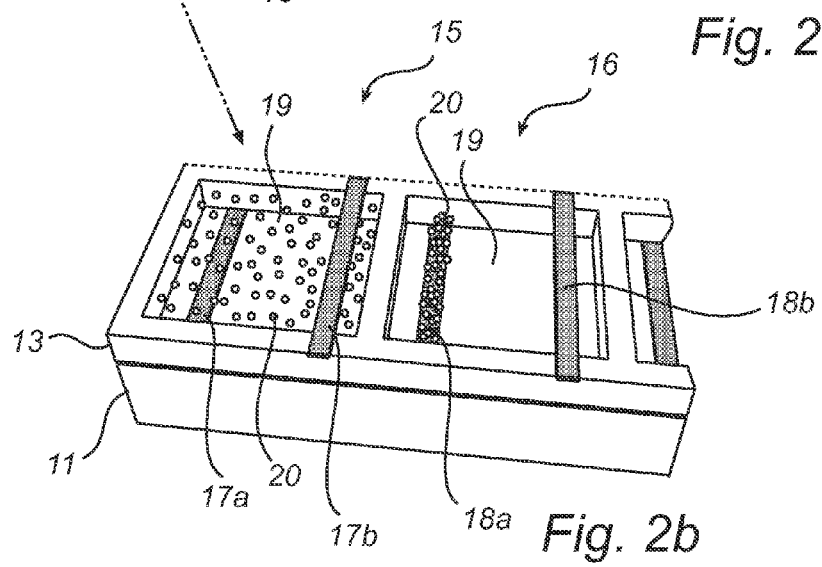

Referring to FIG. 2b, each cell 15, 16 is filled with an optically transparent fluid 19 and a plurality of particles 20 (only one representative particle is indicated in FIG. 2b). Furthermore, to control the cells 15, 16, a plurality of electrode pairs 17a-b, 18a-b (only two pairs are indicated by reference numerals in FIG. 2b) are provided with the first electrode 17a, 18a being arranged on the first substrate 11 and the second electrode 17b, 18b being arranged on the second substrate 12.

With continued reference to FIG. 2b, the cell 15 to the left in FIG. 2b is in a state in which the particles 20 are dispersed in the fluid 19 so that the appearance of the surface covered by the cell 15 is determined by the optical properties of the particles 20. Typically, the particles 20 are in the dispersed state shown in the left cell 15 in FIG. 2b when there is no voltage difference between the first 17a and second 17b electrodes.

Turning now to the cell 16 to the right in FIG. 2b, the particles 20 have been concentrated to the first electrode 18a through application of a suitable voltage between the first 18a and second 18b electrodes. Through the concentration of particles 20 in the cell 16 to the right, the cell 16 is switched to its transparent state and, hence, does not modify the appearance of a surface covered thereby (other than absorbing and/or reflecting some of the light leading to a decreased brightness of the underlying surface).

The appearance-modifying device 10 in FIGS. 2a-b can be configured in various ways, some of which will be described below with reference to FIGS. 3a-b.

Figure 3A:
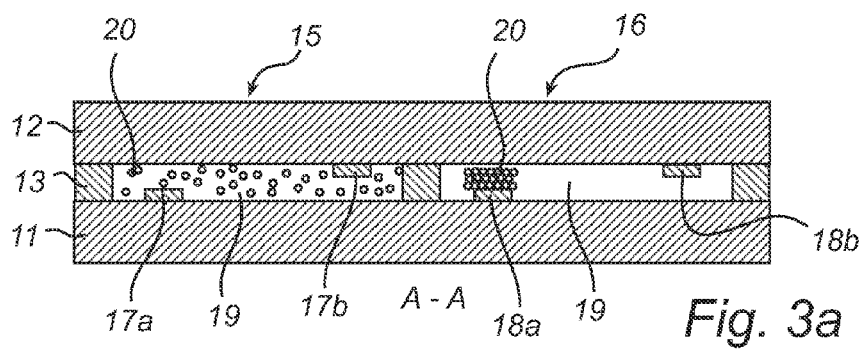

In FIG. 3a, which is a schematic cross-section view of the appearance-modifying device 10 in FIG. 2a taken along the line A-A, a first exemplary configuration of the cells 15, 16 (the same reference numerals as for FIGS. 2a-b are used since the corresponding cells along the line A-A are controlled by the same electrode pairs and are in the same states as the cells 15, 16 of FIGS. 2a-b) are schematically illustrated.

As can be seen in FIG. 3a, the particles 20 in the cell 15 to the left are controlled to be in a state in which they are dispersed in the fluid 19, and the particles 20 in the cell 16 to the right are controlled to be in a state in which they are concentrated at the first particle concentration site defined by the first electrode 18a. The configuration of FIG. 3a corresponds to that shown in FIG. 2b.

In FIG. 3b, which schematically shows a second exemplary configuration of the cells 15, 16, the first and second electrodes 17a-b, 18a-b are covered by respective dielectric layers 21, 22. Covering the first and second electrodes 17a-b, 18a-b by dielectric layers may improve the long term reliability of the appearance-modifying device since the dielectric layer 21 passivates the electrodes such as to prevent Faradyic currents through the electrodes.

With reference to FIGS. 4a-b, another embodiment of the appearance-modifying device according to the present invention will now be described.

FIG. 4a is a schematic plane view of an appearance-modifying device 30 in its transparent state, and FIG. 4b is a schematic plane view of the same appearance-modifying device 30 in its appearance-modifying state.

The appearance-modifying device 30 has a plurality of hexagonal cells 31a-c (only three cells are indicated by reference numerals for the sake of clarity of drawing) separated by a spacer structure 32.

Figure 5A:
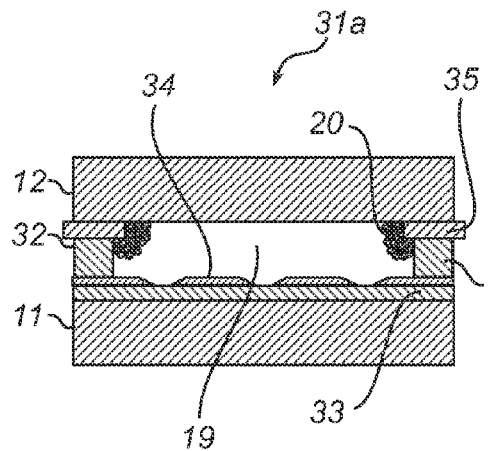
FIGS. 5a-b are partial cross-section views of the appearance-modifying device of FIGS. 4a-b, illustrating a first exemplary configuration of the appearance-modifying device.
Figure 5B:
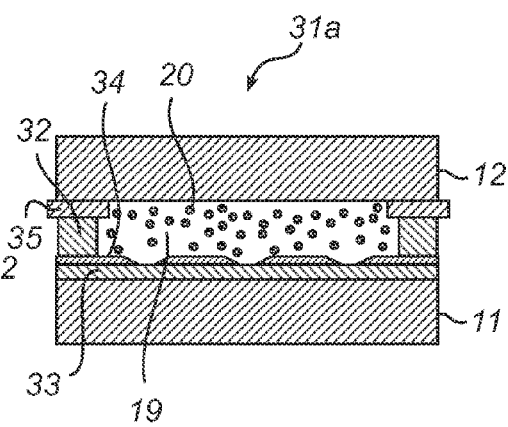

In FIGS. 5a-b, which are schematic cross-section views illustrating a first exemplary configuration of the cells 31a-c of the appearance-modifying device 30, it can be seen that the first electrode is here provided in the form of a transparent electrode layer 33 covering the first substrate 11. The first electrode 33 is in turn partly covered by a dielectric layer 34, separating the spacer structure 32 from the first electrode 33. The second electrode 35 has a pattern that substantially corresponds to the pattern of the spacer structure 32 and is essentially aligned to the spacer structure 32. Here, the second electrode 35 is only partly shielded by the walls. Furthermore, each cell contains a plurality of particles 20 distributed in an optically transparent fluid 19.

In analogy to the previously described configurations, the particles 20 are concentrated to the second particle concentration site 46, defined by the second electrode 35 and the spacer structure 32 when a suitable voltage is applied between the first 33 and second 35 electrodes, as is schematically illustrated in FIG. 5a, and the particles are dispersed in the cell 31a when there is no voltage present between the first 33 and second electrodes 35, as is schematically illustrated in FIG. 5b.

Figure 6A:
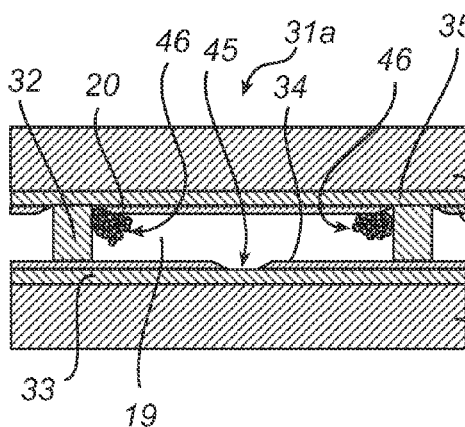
FIGS. 6a-b are partial cross-section views of the appearance-modifying device of FIGS. 4a-b, illustrating a second exemplary configuration of the appearance-modifying device.
Figure 6B:
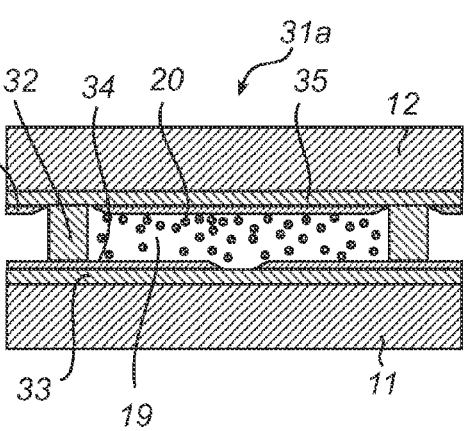

With reference to FIGS. 6a-b, a second exemplary configuration of the cells 31a-c of the appearance-modifying device 30 in FIGS. 4a-b will now be described. The cell configuration shown in FIGS. 6a-b differs from that shown in FIGS. 5a-b in that the second particle concentration site 46, like the first particle concentration site 45, is defined by an opening in a dielectric layer 36 covering the second electrode 35. In the exemplary cell configuration shown in FIGS. 6a-b, the opening in the dielectric layer 36 on the second substrate 12 essentially coincides with the spacer structure 32. It should be noted that this is not necessarily the case, and that the opening may be provided completely inside the cell 31a or only partly coincide with the spacer structure 32.

Figure 7A:
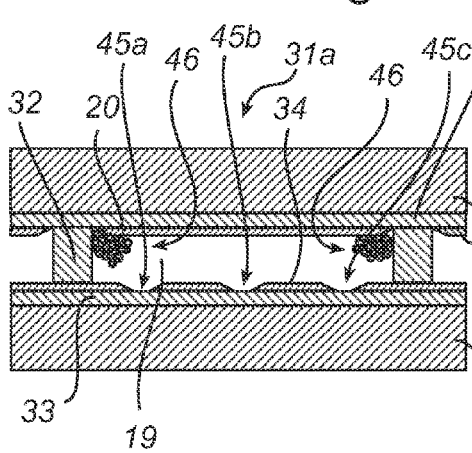
FIGS. 7a-b are partial cross-section views of the appearance-modifying device of FIGS. 4a-b, illustrating a third exemplary configuration of the appearance-modifying device.
Figure 7B:
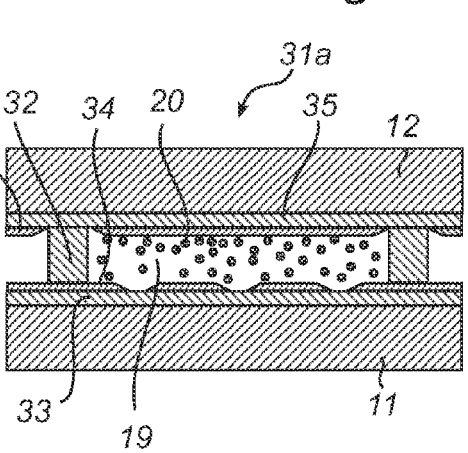

Turning now to FIGS. 7a-b, a third exemplary cell configuration is shown, which differs from that illustrated in FIGS. 5a-b in that each cell 31a is provided with a plurality of first particle concentration sites 45a-c in the form of openings in the dielectric layer 34 covering the first electrode 33.

Through the provision of several first particle concentration sites 45a-c, an overlap between (all of) the first particle concentration site(s) on the first substrate 11 and the second particle concentration site on the second substrate 12 can be prevented. Hereby, the manufacturing of the appearance-modifying device can be facilitated, since the requirements with respect to alignment tolerance are reduced.

Furthermore, the tolerance to bending and deformation of the appearance-modifying device 30 may be improved by providing several openings in the dielectric layer in each cell. This tolerance is an important feature of an appearance-modifying device 30, which should advantageously be capable of conforming to the shape of the device or object to be covered thereby.

FIGS. 8a-b are plane views schematically illustrating two distribution states of an exemplary appearance-modifying device having an aperiodic cell structure.

In the appearance-modifying device 80 illustrated in FIGS. 8a-b, the spacer structure 32 has been configured in such a way that the cells 81a-c defined by the spacer structure 32 form an aperiodic cell structure (in this particular case, a so-called Penrose structure). As in the appearance-modifying device 30 described in connection with FIGS. 4a-b, the appearance-modifying device 80 in FIGS. 8a-b has first particle concentration sites 82 (only one such first particle concentration site is here indicated with a reference numeral for the sake of clarity of drawing) provided in the form of openings in a dielectric layer 83 exposing portions of the first electrode provided on the first substrate.

As can be seen in FIGS. 8a-b, the first particle concentration sites 82 are provided with a higher density than one first particle concentration site per cell 81a-c. Hence, each cell 81a-c or at least a majority of cells, has a plurality of first particle concentration sites 82. As a result, even when large deformations or misalignments occur (e.g. if the appearance-modifying device is to be applied onto a curved object), having a plurality of first particle concentration sites 82 increases the chances of having at least first particle concentration site located within each cell and offset in relation to the second particle concentration site(s) 84 provided on the second substrate after the appearance-modifying device has been applied onto the curved surface. Thus, each cell 81a-c allows for the particles 20 to be concentrated at the first 82 and/or second 84 particle concentration sites within a sufficiently short time period. Hence, by having several openings formed in the dielectric layer, misalignments and deformations can be pre-compensated for beforehand and the appearance-modifying device can be made more robust.

In the following, a method for fast switching of the cells 31a-c of an appearance-modifying device according to an embodiment of the present invention will be described with reference to FIGS. 9a-c, that schematically illustrate one exemplary cell 31a in three different appearance-modifying states.

In the example illustrated in FIGS. 9a-c, the appearance-modifying device corresponds to that described above in connection with FIGS. 5a-b. In the presently illustrated example, the particles 20 are negatively charged.

In the state illustrated in FIG. 9a, there is no voltage applied between the first 33 and second 35 electrodes, and there is, accordingly, no electrical field present in the cell 31a. Therefore, the particles 20 are dispersed within the cell 31a, and the optical properties of the surface covered by at least this part of the appearance-modifying device are determined by the optical properties of the particles 20.

When desiring to switch the cell 31a in FIG. 9a from the distribution state illustrated therein to a distribution state in which the optical properties of the surface covered by the appearance-modifying device are no longer determined by the particles 20, but by the properties of the surface itself or by the properties of the other structures in the cell 31a, such as the first substrate 11, the first electrode 33, the dielectric layer 34 and/or any color filter or colored reflector (not shown in FIGS. 9a-c) depending on application, at least the following options are available:

1. Concentrate the particles 20 to the first particle concentration site 45; or
2. concentrate the particles 20 to the second particle concentration site 46.

In FIG. 9b, which schematically illustrates the first option above, a negative voltage −V has been applied (meaning that the electrical potential of the first electrode 33 is higher than the electrical potential of the second electrode 35). Due to this negative voltage, an electrical field is formed in the cell 31a, which concentrates the particles 20 to the first particle concentration site 45. Because of the considerably smaller particle concentration area of the first particle concentration site 45 (the opening in the dielectric layer 34 compared to the area around the second electrode 35 along the entire perimeter of the cell 31a), the physical concentration of particles 20 at the first particle concentration site 45 becomes high, leading to a clustering of negatively charged particles there. This cluster shields the first electrode 33 and counteracts the electric field, leading to a considerably reduced velocity of particles 20 moving towards the first particle concentration site 45 as is schematically illustrated in FIG. 9b by the migration velocity $v_{mig1}$.

The situation illustrated in FIG. 9b will now be compared with option 2 above, which is schematically illustrated in FIG. 9c.

In the cell 31a illustrated in FIG. 9c, a positive voltage +V has instead been applied (same magnitude, but opposite polarity with respect to −V in FIG. 9b), which leads to the migration of the negatively charged particles 20 towards the second particle concentration site 46 along the perimeter of the cell 31a. Due to the larger particle concentration area of the second particle concentration site 46, the physical concentration of particles at the second particle concentration site 46 becomes considerably lower than was the case in FIG. 9b. After a while, this leads to a much smaller reduction in the migration velocity $v_{mig2}$ of particles 20 moving towards the second particle concentration site 46.

As is evident to the person skilled in the art, the migration velocities $v_{mig1}$, $v_{mig2}$ of particles 20 moving towards the first 45 and second 46 particle concentration sites, respectively, are not constant, but are determined by such factors as the electrical field strength, the particle charge and the mobility of the particles 20 in the fluid 19. In the situations illustrated in FIGS. 9b-c, the migration velocity will initially be higher when the particles 20 move towards the first particle concentration site 45 (as in FIG. 9b) than when the particles 20 move towards the second particle concentration site 46 (as in FIG. 9c), since the electrical field in the vicinity of the first particle concentration site 45 in FIG. 9b is initially higher than the electrical field in the vicinity of the second particle concentration site 46 in FIG. 12c. When, however, a sufficient number of particles 20 have been concentrated to the respective particle concentration sites 45, 46, the migration velocity $v_{mig2}$ in FIG. 9c will be higher than the migration velocity $v_{mig1}$ in FIG. 9b.

In addition to the method for fast switching described above in connection with FIGS. 9a-c, the asymmetric configuration of the cells 31a-c in the appearance-modifying device can be used to achieve four different color states using only the first 33 and the second 35 electrode.

To achieve these additional states, the asymmetric electric field resulting from the configuration of the appearance-modifying device 30 illustrated in FIGS. 4a-b may be used in an appearance-modifying device in which the plurality of particles 20 include a first set 20a of charged particles having a first polarity and a first color, and a second set 20b of charged particles having a second, opposite polarity and a second color.

An exemplary embodiment of such a multi-color appearance-modifying device 100 will now be described with reference to FIGS. 10a-e, showing plane views and cross-section views of a cell 101. The appearance-modifying device 100 in FIGS. 10a-e is similar to the appearance-modifying device of FIGS. 4a-b, except in that the particles 20 are here provided as a mix of positively 20a and negatively 20b charged particles, the positively charged particles 20a having one color, such as cyan, and the negatively charged particles 20b having another color, such as orange. Parts equivalent of those in FIGS. 4a-b are denoted by the same numerals.

Figure 10A:
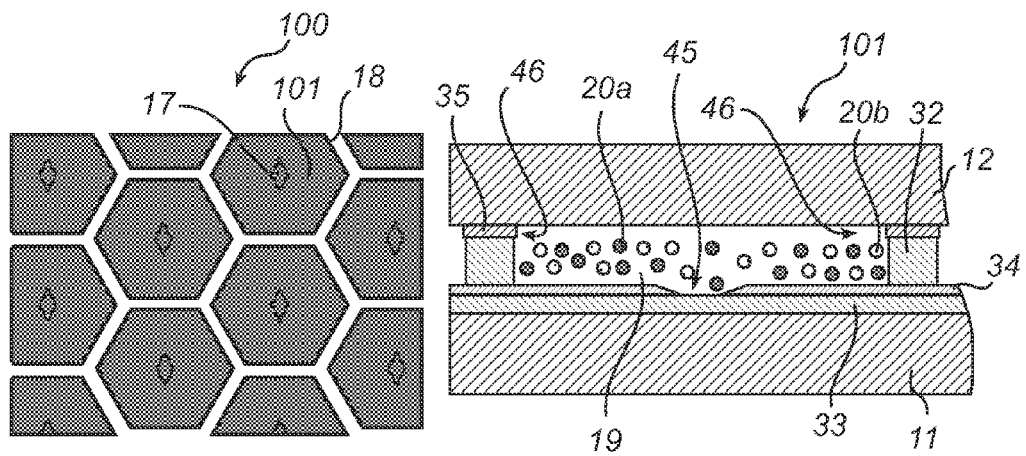
FIGS. 10a-e schematically illustrate different color states of an appearance-modifying device according to another embodiment of the present invention.

A first, mixed color state is illustrated in FIG. 10a. When no electrical field is applied between the first electrode 33 and the second electrode 35, all particles are dispersed within the cell. The optical appearance is here a combination of the two particles 20a, 20b, in this example green color, as a mixture of cyan and orange.

Figure 10B:
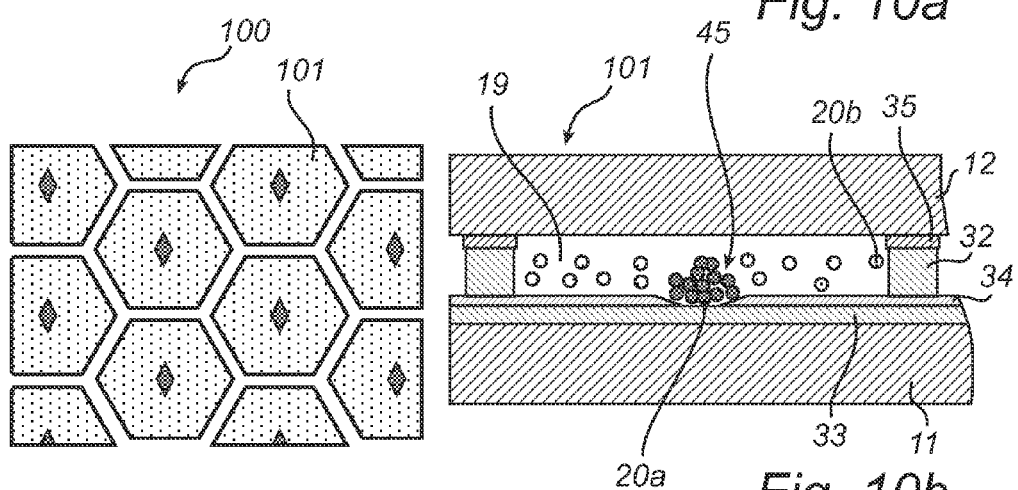

A second color state is illustrated in FIG. 10b. When a sufficient positive potential difference is applied between the first electrode 33 and the second electrode 35, the positively charged particles concentrate adjacent to the first particle concentration site 45, while the negatively charged particles are attracted to the second particle concentration site 46. The electrical field strength at the second particle concentration site 46 (the perimeter of the cell 31a), is smaller than at the first electrode particle concentration site 45 (the opening in the dielectric layer 21 exposing the first electrode 33), resulting in that the negatively charged particles 20b are not affected as much by the field and remain dispersed in the cell. Accordingly, the negatively charged particles 20b will affect the optical appearance of the appearance-modifying device 30, here, orange color.

Figure 10C:
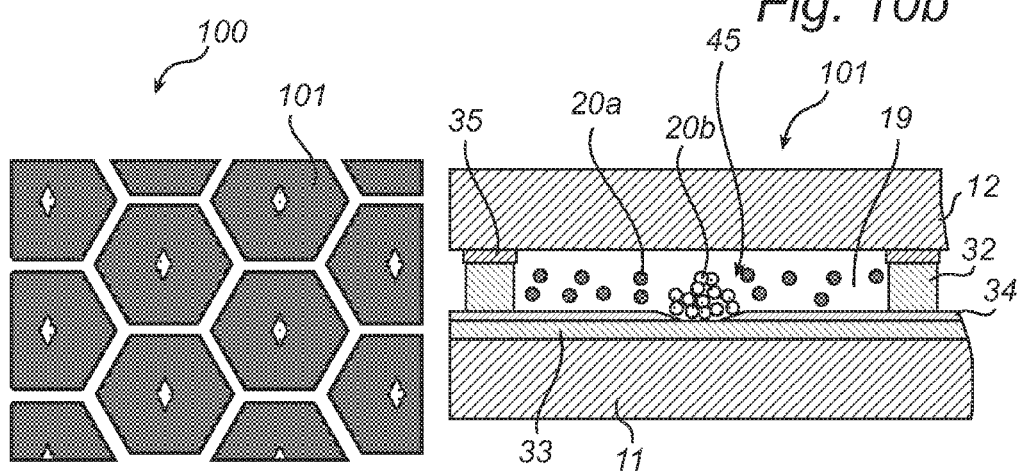

A third color state is illustrated in FIG. 10c. When a sufficient negative potential difference is applied between the first electrode 33 and the second electrode 35, the negatively charged particles 20b concentrate at the first particle concentration site 45 due to the stronger electrical field close to the first particle concentration site 45, while the positively charged particles 20a are attracted to the second particle concentration site 46. As described above in connection with FIG. 10b, the electrical field strength near the second particle concentration site 46, is smaller than at the first particle concentration site 45, resulting in that the positively charged particles 20a are not affected as much and remain dispersed in the cell. Accordingly, the positively charged particles 20a will affect the optical appearance of the appearance-modifying device 30, here, cyan color.

Figure 10D:
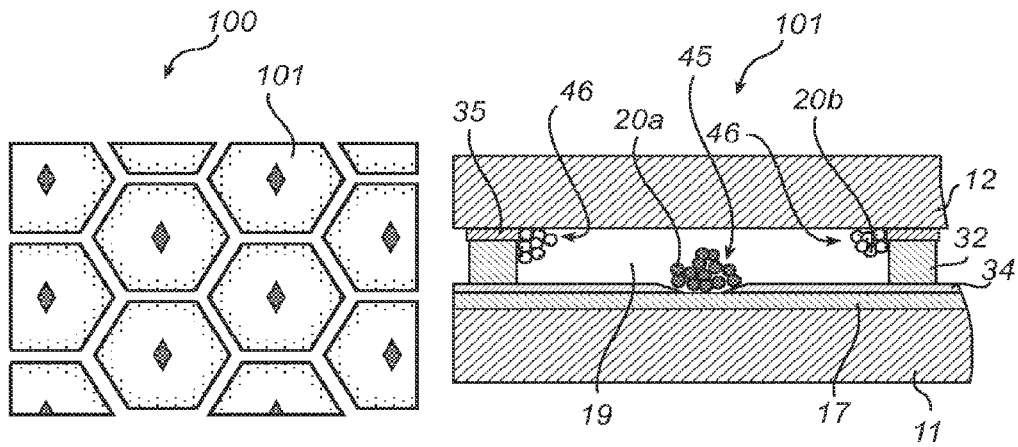
Figure 10E:
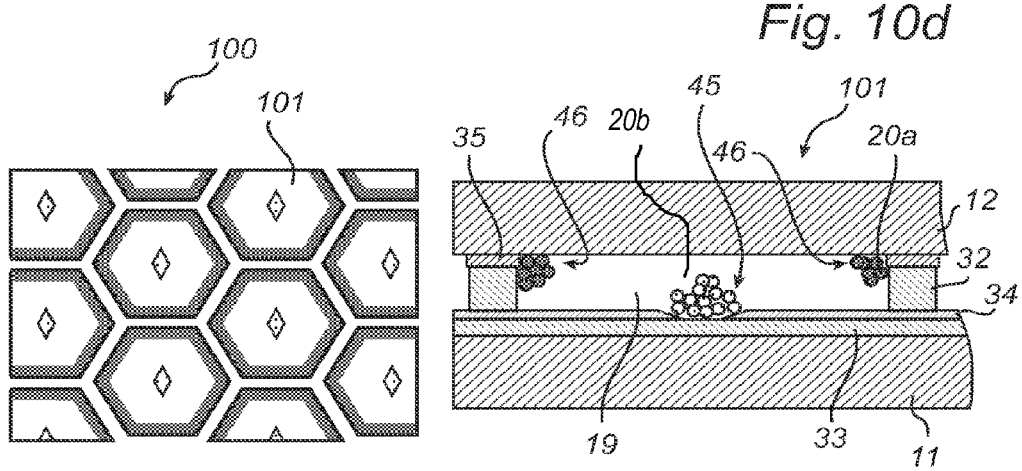

Controlling of the appearance-modifying device 30 to the states where the particles concentrate at different electrodes, depending on polarity, is illustrated in FIGS. 10d-e, resulting in a color state that is not determined by the particles, but rather by the other parts of the appearance-modifying device 30. In particular, the state illustrated in FIGS. 10d-e will be a transparent state if the cell itself has transparent properties.

In FIG. 10d the transparent state is achieved when a sufficiently high positive potential difference is applied between the first electrode 33 and the second electrode 35 for the positively charged particles 20a to concentrate at the first particle concentration site 45, and for the negatively charged particles 20b to concentrate at the second particle concentration site 46.

In FIG. 10e the transparent state is achieved when a sufficiently high negative potential difference is applied between the first electrode 33 and the second electrode 35 for the negatively charged particles 20b to concentrate at the first particle concentration site 45, and for the positively charged particles 20a to concentrate at the second particle concentration site 46.

The person skilled in the art realizes that the present invention is by no means limited to the preferred embodiments. For example, many other cell patterns and electrode configurations may be implemented. For instance, a plurality of particle concentration sites may be provided on both the first and the second substrate.

The invention claimed is:

1. An appearance-modifying device, for modifying the visual appearance of a surface covered thereby, the device comprising:
   a first substrate having a first electrode arranged on a first side thereof;
   a second substrate arranged opposite the first side of the first substrate, the second substrate having a second electrode arranged on a side thereof facing the first substrate;
   a spacer structure spacing apart the first substrate and the second substrate wherein a space between the first and second substrates is divided into a plurality of cells,
   in each cell, an optically transparent fluid having a plurality of particles is dispersed therein, the particles being moveable in the fluid through application of an electric field,
   a distribution state of the particles within a cell is controllable by application of a voltage between the first and second electrodes, the distribution state of the particles comprising:
   a first distribution state in which the particles are dispersed throughout said cell and an appearance of the surface covered by the appearance-modifying device is determined by optical properties of the particles; and
   a second distribution state in which the particles are concentrated to one of a first particle concentration site provided on the first substrate and a second particle concentration site provided on the second substrate, the second particle concentration site being displaced in relation to the first particle concentration site in a plane parallel to the appearance-modifying device and along a perimeter of said cell, wherein the cell is optically transparent in the second distribution state and the surface covered by the appearance-modifying device is seen through said optically transparent cell.

2. The appearance-modifying device according to claim 1, wherein the distribution state of the particles is simultaneously controllable in a plurality of the cells, through application of the voltage between the first and second electrodes.

3. The appearance-modifying device according to claim 2, wherein the first and second electrodes are arranged to simultaneously control at least 100 cells.

4. The appearance-modifying device according to claim 1, wherein for each cell, a ratio between an area controllable by the first and second electrodes between the first and second distribution states, and the total area of the cell is greater than 70%.

5. The appearance-modifying device according to claim 1, wherein a total area of each cell is greater than 0.01 mm$^2$.

6. The appearance-modifying device according to claim 1, wherein the first electrode is covered by a dielectric layer and the first particle concentration site is provided as an opening in the dielectric layer, exposing a portion of the first electrode.

7. The appearance-modifying device according to claim 6, wherein the dielectric layer has a plurality of openings exposing corresponding portions of the first electrode, thereby providing a plurality of first particle concentrations sites.

8. The appearance-modifying device according to claim 1, wherein the second electrode is covered by a dielectric layer and the second particle concentration site is provided as an opening in the dielectric layer, exposing a portion of the second electrode.

9. The appearance-modifying device according to claim 1, wherein the spacer structure is configured in such a way that an aperiodic cell pattern is formed by the plurality of cells.

10. The appearance-modifying device according to claim 1, wherein the plurality of particles comprises a first set of negatively charged particles and a second set of positively charged particles.

11. The appearance-modifying device according to claim 1, wherein the second particle concentration site has a larger particle concentration area than the first particle concentration site.

12. A method for operating an appearance-modifying device, said device comprising:
  a first substrate having a first electrode arranged on a first side thereof;
  a second substrate arranged opposite the first side of the first substrate, the second substrate having a second electrode arranged on a side thereof facing the first substrate;
  a spacer structure spacing apart the first substrate and the second substrate wherein a space between the first and second substrates is divided into a plurality of cells, in each cell, an optically transparent fluid having a plurality of particles dispersed therein, the particles being moveable in the fluid through application of an electric field,
  wherein a distribution state of the particles within a cell is achieved by application of a voltage between the first and second electrodes, the distribution state of the particles comprises:
    a first distribution state in which the particles are dispersed throughout said cell and an appearance of the surface covered by the appearance-modifying device is determined by optical properties of the particles; and
    a second distribution state in which the particles are concentrated to one of a first particle concentration site provided on the first substrate and a second particle concentration site provided on the second substrate, the second particle concentration site being displaced in relation to the first particle concentration site in a plane parallel to the appearance-modifying device and along a perimeter of said cell, wherein the cell is optically transparent in the second distribution state and the surface covered by the appearance-modifying device is seen through said optically transparent cell, the method comprising the steps of:
  determining a voltage between the first and second electrodes resulting in an electric field configured to concentrate the particles at the second particle concentration site; and
  applying the voltage between the first and second electrodes to concentrate the particles at the second particle concentration site.

13. A method for operating an appearance-modifying device comprising:
  a plurality of cells, each cell comprising a plurality of particles including a first set of charged particles having a first color and a first polarity and a second set of charged particles having a second color and a second polarity, opposite the first polarity, distributed in an optically transparent fluid, and first and second electrodes for enabling laterally displacing the particles to concentrate the particles at one of a corresponding first particle concentration site and a second particle concentration site through application of a voltage between the first and second electrodes, wherein the first particle concentration site is positioned substantially in a center of the cell and the second particle concentration site is opposite to the first concentration site and positioned along a perimeter of the cell,
  wherein the cell is configured such that application between the first and second electrodes of a given voltage results in a first electric field adjacent to the first particle concentration site and a second electric field adjacent to the second particle concentration site, the first electric field having a higher field strength than the second electric field, the method comprising the steps of:
    determining a polarity and a magnitude of the voltage between the first electrode and the second electrode resulting in the first electric field being sufficiently strong to concentrate the first set of charged particles to the first electrode, and that the second electric field is so weak that the second set of particles substantially remain in a dispersed state; and
  applying the determined polarity and magnitude of the voltage between the first and second electrodes to thereby control the cell to a state having substantially the second color.

* * * * *